US011951766B2

(12) United States Patent
Lee

(10) Patent No.: US 11,951,766 B2
(45) Date of Patent: Apr. 9, 2024

(54) EQUAL DIVIDER

(71) Applicant: SENTOU INDUSTRY CO., LTD., Yuanli Township, Miaoli County (TW)

(72) Inventor: Tai-Yu Lee, Taichung (TW)

( * ) Notice: Subject to any disclaimer, the term of this patent is extended or adjusted under 35 U.S.C. 154(b) by 56 days.

(21) Appl. No.: 17/930,830

(22) Filed: Sep. 9, 2022

(65) Prior Publication Data

US 2024/0083193 A1 Mar. 14, 2024

(51) Int. Cl.
*B43L 9/08* (2006.01)

(52) U.S. Cl.
CPC .................................... *B43L 9/08* (2013.01)

(58) Field of Classification Search
CPC .................................................. B43L 9/08
See application file for complete search history.

(56) References Cited

U.S. PATENT DOCUMENTS 370,939 A * 10/1887 Frankenberg ........... B43L 13/10 266/63
829,938 A * 8/1906 Cote ......................... B43L 9/08 33/558.02
834,470 A * 10/1906 Hanssen ................. B44B 3/002 33/25.1
1,952,494 A * 3/1934 Gafford .................. A47G 19/08 248/172
3,475,819 A * 11/1969 Glavan ................... B43L 13/10 33/25.1
4,527,341 A * 7/1985 Schon ...................... G01B 3/56 33/461
7,373,727 B2 * 5/2008 Bruce ...................... G01B 3/56 33/461
9,250,072 B2 * 2/2016 Lévy ...................... G01C 15/00
2013/0291392 A1 * 11/2013 Swamy .................. G01B 3/002 33/415
2014/0360038 A1 * 12/2014 Levy ......................... B43L 9/08 33/669

FOREIGN PATENT DOCUMENTS

CH 708148 A2 * 12/2014 ............ B43L 13/001
EP 0145040 A2 * 6/1985 ............... G01B 3/56
WO WO-2012098561 A2 * 7/2012 ............ G01B 3/002

* cited by examiner

*Primary Examiner* — Yaritza Guadalupe-McCall
(74) *Attorney, Agent, or Firm* — Egbert, McDaniel & Swartz, PLLC

(57) ABSTRACT

Disclosed is an equal divider, including a mainframe and a plurality of indicator plates, wherein the mainframe is mainly made up of a plurality of first connecting rods and a plurality of second connecting rods pivoted by a plurality of pivoting structures to form a scissor structure. The mainframe is formed with a plurality of first pivoting parts and a plurality of second pivoting parts. The first pivoting parts and the second pivoting parts pivot the first connecting rods and the second connecting rods. The indicator plate is configured between the first connecting rod and the second connecting rod. The indicator plate is configured with a protruding indicating part. Each indicator plate is configured with a long through groove. The second pivoting part goes through the through groove. The indicating parts and the first pivoting parts maintain a fixed distance along the second axial direction.

6 Claims, 11 Drawing Sheets

EQUAL DIVIDER

CROSS-REFERENCE TO RELATED U.S. APPLICATIONS

Not applicable.

BACKGROUND OF THE INVENTION

1. Field of the Invention

The present invention relates generally to a tool used by carpenters, and more particularly to an equal divider to facilitate marking of equal divisions.

2. Description of Related Art Including Information Disclosed Under 37 CFR 1.97 and 37 CFR 1.98

When it is needed to mark uniform divisions of a particular range of a workpiece along a preset straight line, an equal divider becomes very handy. Without the need to use a ruler to measure the size of the range and to calculate the size of each partition, the equal divider can quickly mark the required equal divisions.

An equal divider comprises a mainframe and a plurality of indicator plates, wherein the mainframe is mainly made up of a plurality of first connecting rods and second connecting rods arranged in a staggered form one behind the other, and pivoted by a plurality of first rivet to form a scissor structure. The first connecting rods and the second connecting rods are both flat and long plates made of metal materials. The top side of the mainframe is formed with a plurality of first pivoting parts, whereas the bottom side of the mainframe is formed with a plurality of second pivoting parts. A virtual first axial direction is defined. The two ends of the first axial direction respectively point to the left side and right side of the mainframe. Each of the first pivoting parts are distributed at equal intervals along the first axial direction, and each of the second pivoting parts are distributed at equal intervals along the first axial direction. A virtual second axial direction is defined to be perpendicular to the first axial direction. The two ends of the second axial direction respectively point to the top side and bottom side of the mainframe. Each of the first pivoting parts and each of the second pivoting parts match one another along the second axial direction. The top sides of the first connecting rods and the second connecting rods are overlapped pair by pair and pivoted by second rivets to form the first pivoting parts. The bottom sides of the first connecting rods and the second connecting rods are overlapped pair by pair and pivoted by third rivets to form the second pivoting parts. The mainframe can expand or shrink along the first axial direction. Each of the first pivoting parts can be displaced along the first axial direction while maintaining equal distances, and the distances between each of the adjacent first pivoting parts along the first axial direction can be changed.

The indicator plate is a flat and long plate made of a metal material, configured on the back side of the mainframe and overlapping the second connecting rods. The second rivets and third rivets configured along the second axial direction respective pivot the indicator plate. The top side of the indicator plate close to the first pivoting parts is configured with an upward protruding indicating part. One side of the indicating part is formed with an indicating face along the second axial direction. The indicating faces provide lateral support for the marking tool to draw equidistant marking lines. When the mainframe expands or shrinks along the first axial direction, each of the indicating parts can be displaced along the first axial direction while maintaining equal distances, and the distances between each of the adjacent indicating faces along the first axial direction can be changed, so that required number of equidistant lines can be marked based on the size ranges of each of the indicating faces along the first axial direction.

The indicator plate is configured with a through groove along the second axial direction. The first rivet goes through the through groove. The mainframe expands or shrinks along the first axial direction. The indicator plate slides in a reciprocating manner along the second axial direction of the mainframe. The indicating parts move close to or away from the first pivoting parts along the second axial direction.

When operating the mainframe to expand, the indicating parts along the second axial direction move away from the first pivoting parts. The indicating parts are prominently protruded out of the top side of the mainframe. The indicating parts are subject to deformation or breakage due to collision by foreign objects, and deformed or broken indicating parts may no longer be used for marking equidistant lines.

The equal divider uses the first rivets to rivet the first connecting rods and the second connecting rods, and uses the second rivets and the third rivets to rivet the first connecting rods, the second connecting rods, and the indicator plates. During the riveting operation, the riveting must be effective, and the first connecting rods, the second connecting rods, and the indicator plates must be able to rotate freely in relation to each other. Therefore, the riveting operation is quite difficult.

BRIEF SUMMARY OF THE INVENTION

The main object of the invention is to provide an equal divider.

The problem-solving technical feature of the invention is that the equal divider comprises a mainframe mainly made up of a plurality of first connecting rods and second connecting rods, arranged sequentially one behind the other and pivoted by a plurality of pivoting structures to form a scissor structure. Both the first connecting rods and the second connecting rods are long plate. The top side of the mainframe is formed with a plurality of first pivoting parts. The bottom side of the mainframe is formed with a plurality of second pivoting parts. A virtual first axial direction is defined. The two ends of the first axial direction respectively point to the left side and right side of the mainframe. The first pivoting parts are distributed at equal intervals along the first axial direction, and the second pivoting parts are distributed at equal intervals along the first axial direction. A virtual second axial direction is defined to be perpendicular to the first axial direction. The two ends of the second axial direction respectively point to the top side and bottom side of the mainframe. Each of the first pivoting parts and each of the second pivoting parts match each other along the second axial direction one by one. The top sides of the first connecting rod and the second connecting rod are arranged one behind the other. The first pivoting parts along the thickness direction of the first connecting rods and the second connecting rods pivot the first connecting rods and the second connecting rods. The bottom sides of the first connecting rods and the second connecting rods are arranged one behind the other. The second pivoting parts along the thickness direction of the first connecting rods and the second connecting rods pivot the first connecting rods and the second connecting rods.

A plurality of indicator plates made of long plates are provided. Each indicator plate being configured between the first connecting rod and the second connecting rod. The first pivoting parts and the second pivoting parts configured along the second axial direction respective rivet the same indicator plate. The top side of the indicator plate close to the first pivoting part is configured with an upward protruding indicating part. One side of the indicating part is formed with an indicating face along the second axial direction. The indicating face provides lateral support for the marking tool to draw equidistant marking lines/The mainframe expands or shrinks along the first axial direction, and each of the indicating part can be displaced along the first axial direction while maintaining equal distances.

The indicator plate is configured with a long through groove along the second axial direction. The second pivoting part goes through the through groove, each indicating part and each first pivoting part maintain a fixed distance along the second axial direction.

The first pivoting part comprises a first shaft tube and a first screw bolt. The first connecting rod is configured with a first through hole. The indicator plate is configured with a perforation. One end of the first shaft tube is connected to the second connecting rods. The first shaft tube goes through the perforation and the first through hole in the axial direction. The first screw bolt screws into the first shaft tube. The first screw bolt has a first bolt head abutting the first shaft tube. The first bolt head and the first connecting rod are formed with relative stoppers along the axial direction of the first shaft tube. A first gap is formed between the first bolt head and the first connecting rod.

The second pivoting part comprises a second shaft tube and a second screw bolt. The first connecting rods is configured with a second through hole. One end of the second shaft tube is connected to the second connecting rods, the second shaft tube goes through the through groove and the second through hole along the axial direction. The second screw bolt screws into the second shaft tube. The second screw bolt has a second bolt head abutting the second shaft tube. The second bolt head and the first connecting rod are formed with relative stoppers along the axial direction of the second shaft tube. A second gap is formed between the second bolt head and the first connecting rod.

Each pivoting structure comprises a third shaft tube and a third screw bolt. Each first connecting rod is configured with a third through hole. One end of the third shaft tube is connected to the second connecting rod, the third shaft tube goes through the third through hole in the axial direction. The third screw bolt screws into the third shaft tube. The third screw bolt has a third bolt head abutting the third shaft tube. The third bolt head and the first connecting rod are formed with relative stoppers along the axial direction of the third shaft tube. A third gap is formed between the third bolt head and the first connecting rods.

The radial periphery of the third shaft tube is formed with a supporting face. The first connecting rod abuts the supporting face in the direction facing the second connecting rods.

When the mainframe expands along the first axial direction, the indicating part will not protrude further toward the front side of the mainframe, thus avoiding the possibility of deformation or damage in case of collision with a foreign object.

DETAILED DESCRIPTION OF THE INVENTION

Figure 1:
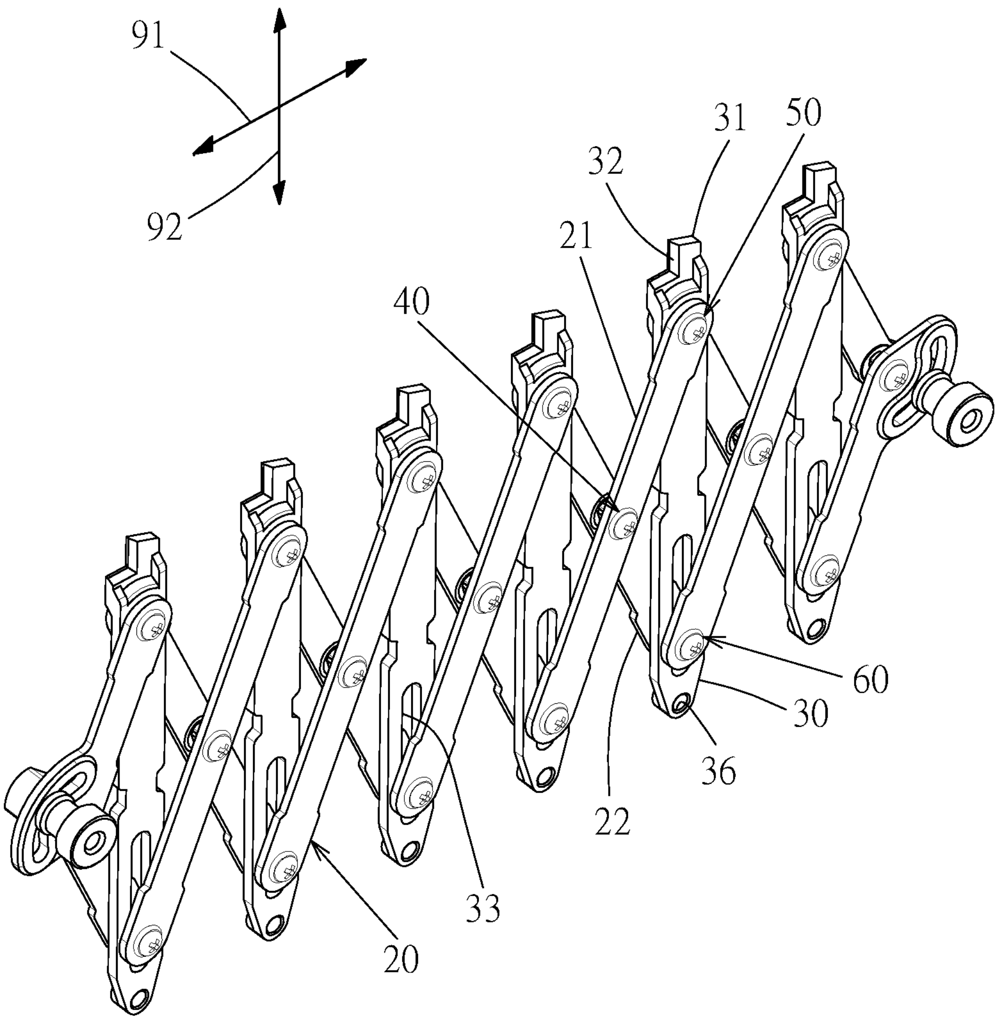
FIG. 1 is a perspective view of a preferred embodiment of the invention.
Figure 2:
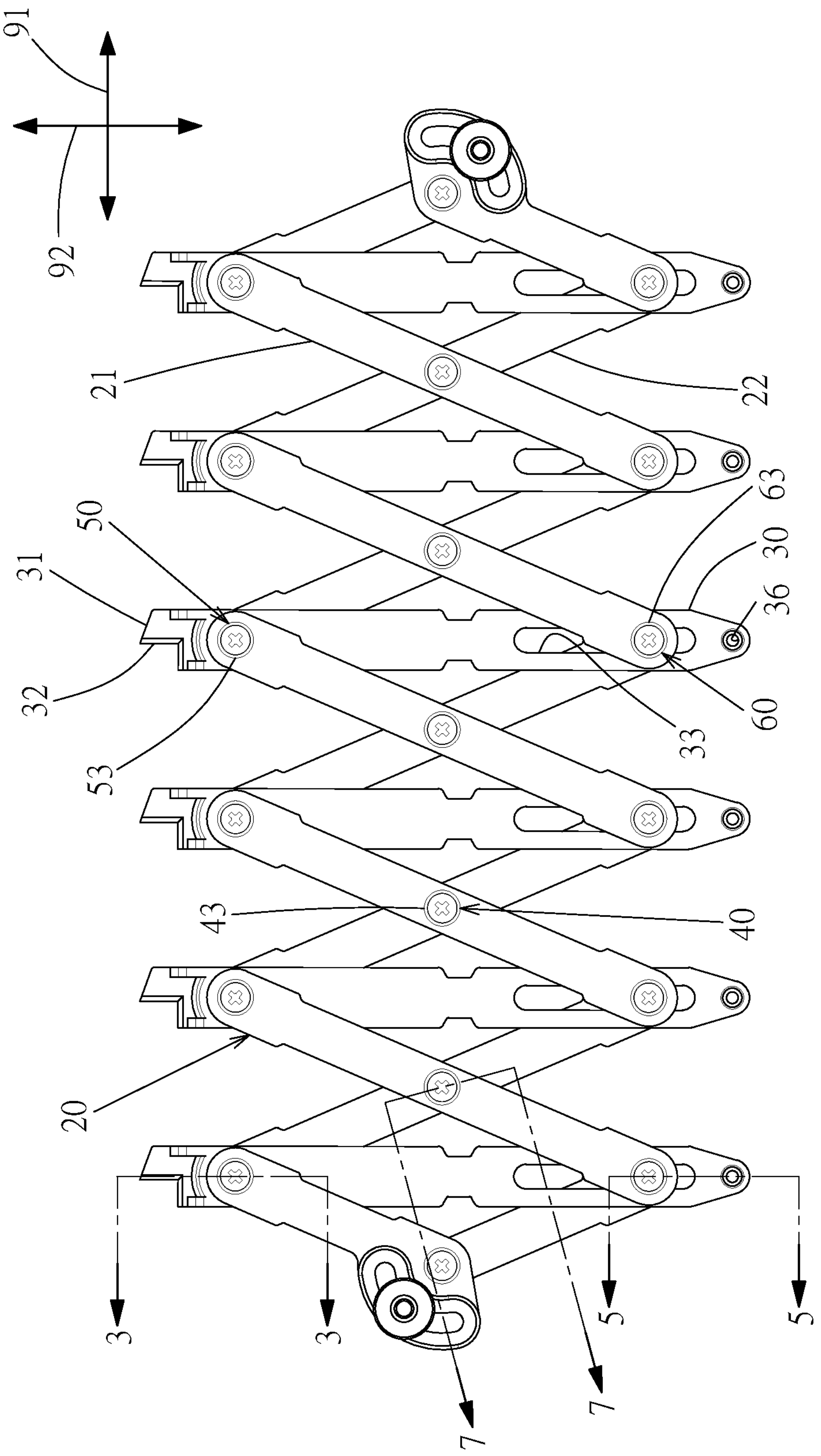
FIG. 2 is a front view of a preferred embodiment of the invention.
Figure 3:
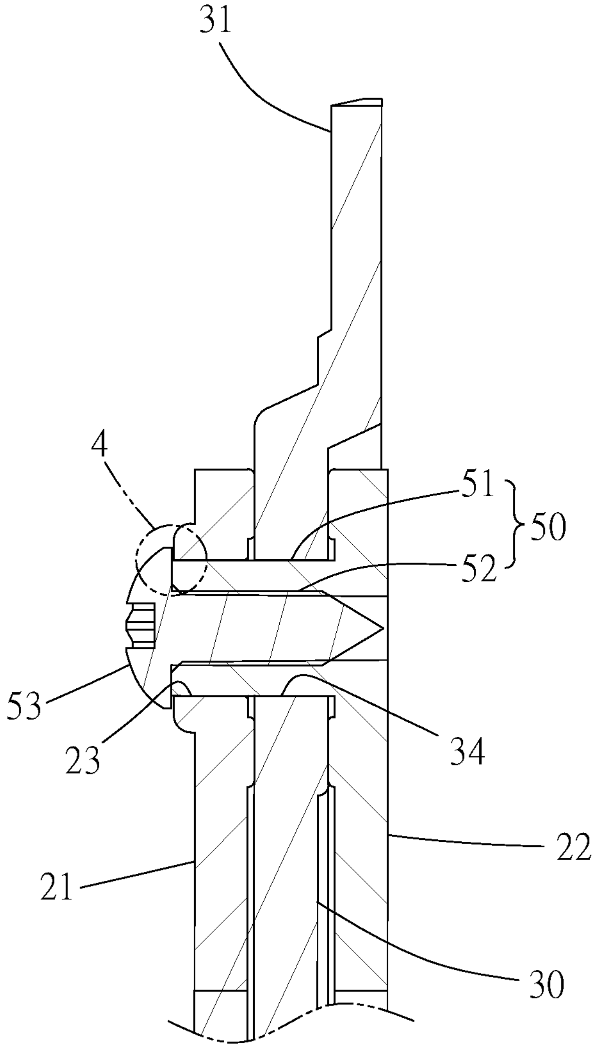
FIG. 3 is a 3-3 sectional view of FIG. 2.
Figure 4:
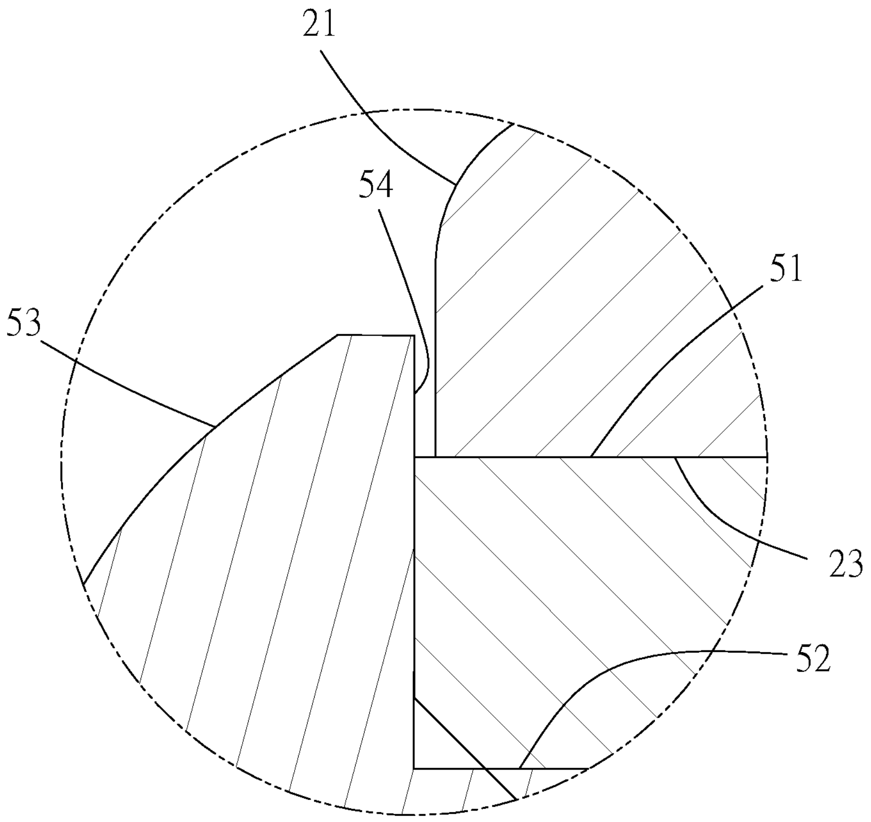
FIG. 4 is a partial enlarged view of FIG. 3.
Figure 5:
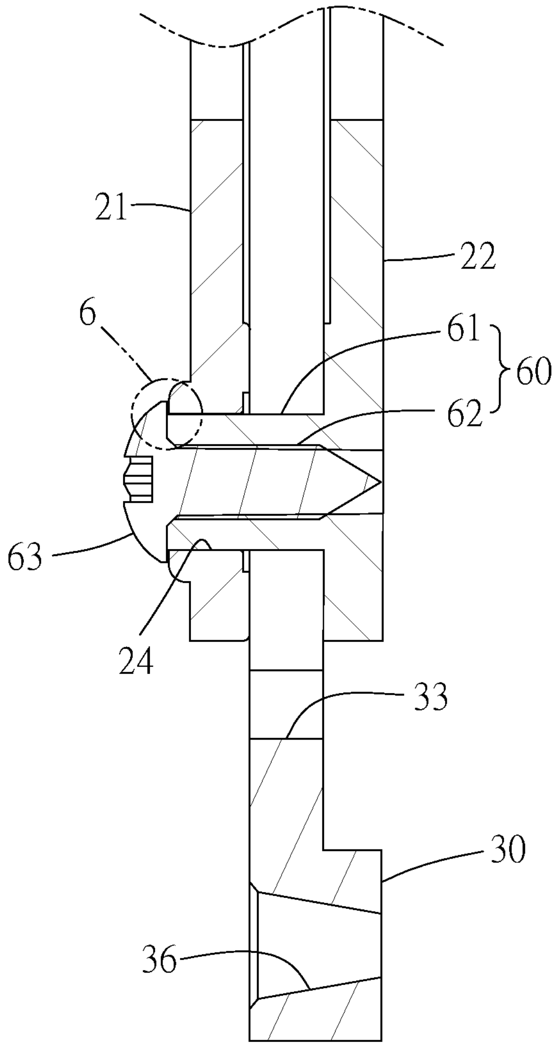
FIG. 5 is a 5-5 sectional view of FIG. 2.
Figure 6:
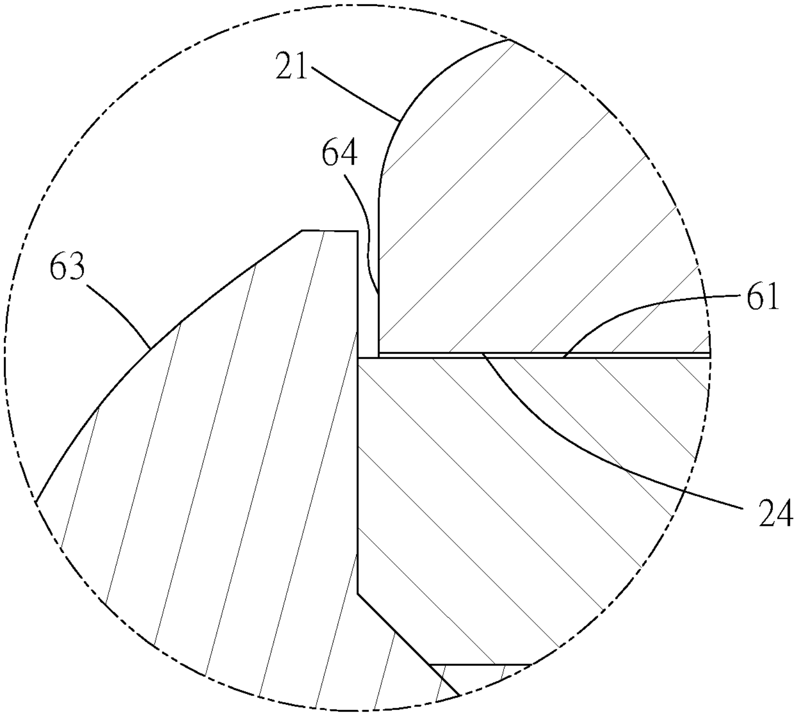
FIG. 6 is a partial enlarged view of FIG. 5.
Figure 7:
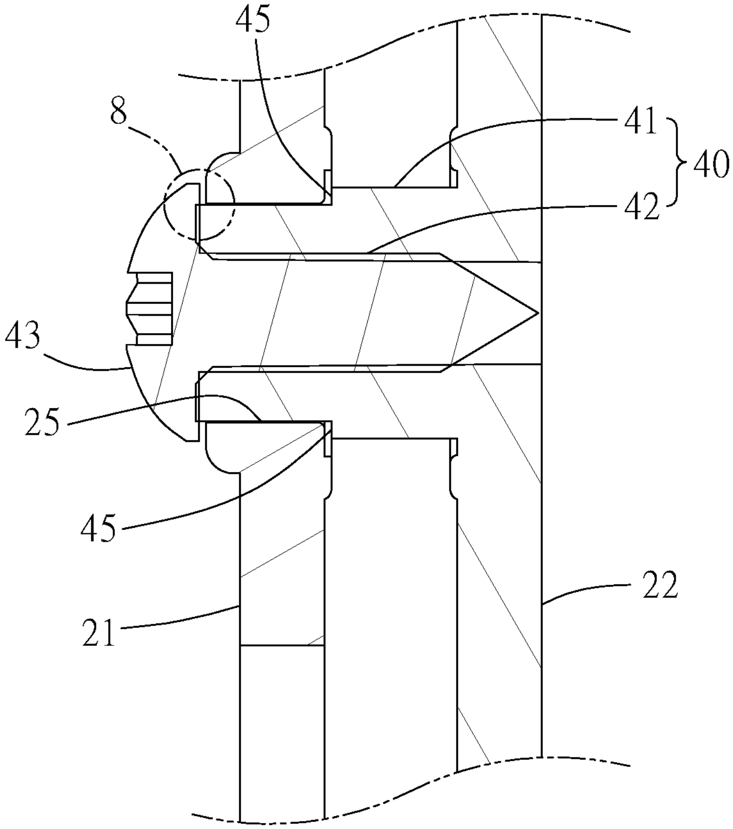
FIG. 7 is a 7-7 sectional view of FIG. 2.
Figure 8:
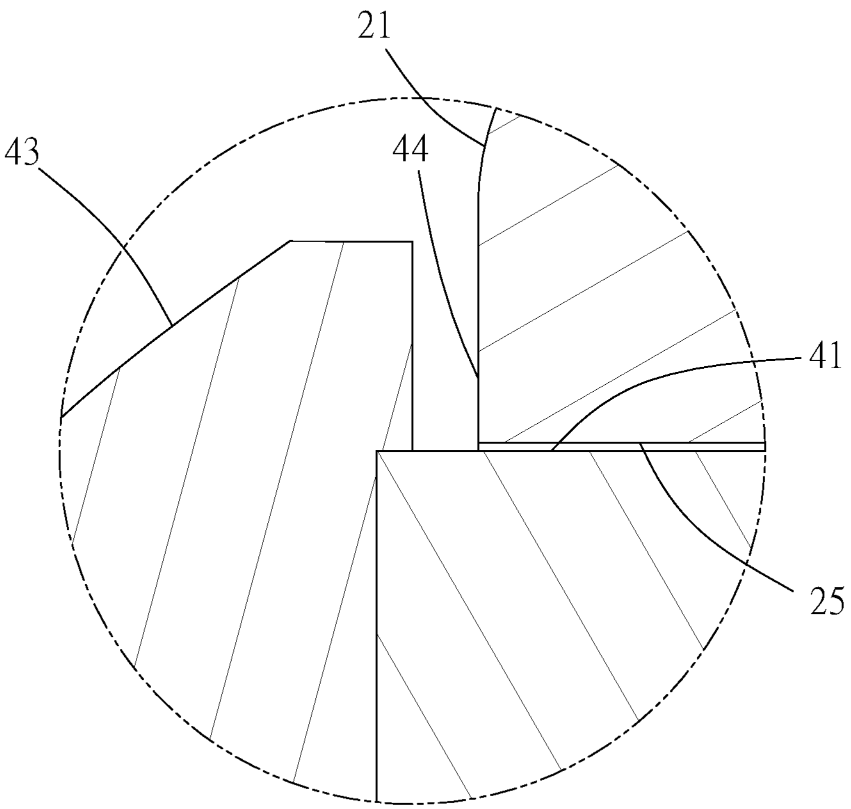
FIG. 8 is a partial enlarged view of FIG. 7.

As shown in FIG. 1 to FIG. 11, a preferred embodiment of the present invention of an equal divider comprises a mainframe 20 and an indicator plate 30 made up of a plurality of long plates, wherein the mainframe 20 is mainly made up of a plurality of first connecting rods 21 and a plurality of second connecting rods 22 distributed sequentially and positioned opposite to each other, together with a plurality of pivoting structures 40 pivoting them together to form a scissor structure. The first connecting rods 21 and the second connecting rods 22 are both long plates. The first connecting rods 21, the second connecting rods 22, and the indicator plates 30 are respectively made of plastic materials. The top side of the mainframe 20 is formed with a plurality of first pivoting parts 50, whereas the bottom side of the mainframe 20 is formed with a plurality of second pivoting parts 60. A virtual first axial direction 91 is defined. The two ends of first axial direction 91 respectively point to the left side and right side of the mainframe 20. The first pivoting parts 50 are distributed at equal intervals along the first axial direction 91. The second pivoting parts 60 are distributed at equal intervals along the first axial direction 91. A virtual second axial direction 92 is defined to be perpendicular to the first axial direction 91. The two ends of the second axial direction 92 respectively point to the top side and bottom side of the mainframe 20. Each of the first pivoting parts 50 and each of the second pivoting parts 60 match each other along the second axial direction 92 one by one. The top sides of the first connecting rods 21 and the second connecting rods 22 are arranged one behind the other. The first pivoting parts 50 pivot the first connecting rods 21 and the second connecting rods 22 together along the thickness direction of the first connecting rods 21 and the second connecting rods 22. The bottom sides of the first connecting rods 21 and the second connecting rods 22 are arranged one behind the other. The second pivoting parts 60 pivot the first connecting rods 21 and the second connecting rods 22 together along the thickness direction of the first connecting rods 21 and the second connecting rods 22. Each of the first pivoting parts 50 can be displaced along the first axial direction 91 while maintaining equal distances between each other, and changing the distances between each of the adjacent first pivoting parts 50 along the first axial direction 91.

The indicator plate 30 is configured between the first connecting rods 21 and the second connecting rods 22. The first pivoting part 50 and the second pivoting part 60 configured along the second axial direction 92 respective rivet the same indicator plate 30. The top side of the indicator plate 30 close to the first pivoting part 50 is configured with an upward protruding indicating part 31.

One side of the indicating part 31 along the second axial direction 92 is formed with an indicating face 32. The indicating face 32 provides lateral support for the marking tool 93 to draw equidistant marking lines 94. The mainframe 20 expands or shrinks along the first axial direction 91. Each of the indicating part 31 can be displaced along the first axial direction 91 while maintaining equal distances, and the distances between the indicating faces 32 along the first axial direction 91 can be changed, for the user to mark the required equidistant lines within the range of the workpiece along the first axial direction 91.

The indicator plate 30 is configured with a long through groove 33 along the second axial direction 92. The second pivoting part 60 goes through the through groove 33. The indicating part 31 and the first pivoting part 50 maintain a fixed distance along the second axial direction 92.

As the second pivoting part 60 goes through the long through groove 33, when operating the mainframe 20 along the first axial direction 91 to expand toward the left side and right side, the second pivoting parts 60 slide up and down along the through groove 33 in relation to the indicator plate 30. The indicating part 31 and the first pivoting part 50 maintain a fixed distance along the second axial direction 92. The indicating part 31 will not protrude further toward the top side of the mainframe 20, thus reducing the possibility of deformation or breakage of the indicating part 31 in case of collision with foreign objects.

The first pivoting part 50 comprises a first shaft tube 51 and a first screw bolt 52, wherein the first connecting rod 21 is configured with a first through hole 23, the indicator plate 30 is configured with a perforation 34. One end of the first shaft tube 51 is connected to the second connecting rods 22. The first shaft tube 51 goes through the perforation 34 and the first through hole 23 in the axial direction. The first screw bolt 52 screws into the first shaft tube 51. One end of the first screw bolt 52 has a first bolt head 53 abutting the first shaft tube 51. The outer diameter of the first bolt head 53 is larger than the outer diameter of the first shaft tube 51. The first bolt head 53 and the first connecting rod 21 is formed with relative stoppers along the axial direction of the first shaft tube 51. A first gap 54 is formed between the first bolt head 53 and the first connecting rod 21, so that the first bolt head 53 and the second connecting rod 22 will not relatively press the first connecting rod 21 and the indicator plate 30, and the first connecting rod 21, the indicator plate 30 and the second connecting rod 22 can rotate in relation to each other.

The second pivoting part 60 comprises a second shaft tube 61 and a second screw bolt 62, wherein the first connecting rod 21 is configured with a second through hole 24. One end of the second shaft tube 61 is connected to the second connecting rods 22. The second shaft tube 61 goes through the through groove 33 and the second through hole 24 along the axial direction. The second screw bolt 62 screws into the second shaft tube 61. One end of the second screw bolt 62 has a second bolt head 63 abutting the second shaft tube 61. The outer diameter of the second bolt head 63 is larger than the second shaft tube 61. The second bolt head 63 and the first connecting rod 21 is formed with relative stoppers along the axial direction of the second shaft tube 61. A second gap 64 is formed between the second bolt head 63 and the first connecting rod 21, so that the second bolt head 63 and the second connecting rods 22 will not relatively press the first connecting rod 21 and the indicator plate 30. The first connecting rods 21, the indicator plate 30 and the second connecting rods 22 can rotate in relation to each other, and the second shaft tube 61 can slide in a reciprocating manner along long the through groove 33.

The pivoting structures 40 comprises a third shaft tube 41 and a third screw bolt 42, wherein the first connecting rods 21 is configured with a third through hole 25. One end of the third shaft tube 41 is connected to the second connecting rods 22. The third shaft tube 41 goes through the third through hole 25 in the axial direction. The third screw bolt 42 screws into the third shaft tube 41. One end of the third screw bolt 42 has a third bolt head 43 abutting the third shaft tube 41. The outer diameter of the third bolt head 43 is larger than the outer diameter of the third shaft tube 41. The third bolt head 43 and the first connecting rods 21 is formed with relative stoppers along the axial direction of the third shaft tube 41. A third gap 44 is formed between the third bolt head 43 and the first connecting rods 21, so that the third bolt head 43 will not relatively press the first connecting rods 21.

The first shaft tube 51, the second shaft tube 61, and the third shaft tube 41 are all integrally formed through plastic injection and connected to the second connecting rods 22.

The radial periphery of the third shaft tube 41 is formed with two supporting faces 45. The first connecting rod 21 abuts the supporting face 45 in the direction facing the second connecting rods 22. The third shaft tube 41 supports the first connecting rods 21 through the supporting face 45. The distance between the supporting face 45 and the second connecting rod 22 is preferably larger than the thickness of the indicator plate 30, so that, when arranged one behind the other between the first connecting rod 21 and the second connecting rod 22, a sufficient space is formed to allow configuration of the indicator plate 30, and the first connecting rod 21, the second connecting rod 22 and the indicator plate 30 can rotate in relation to each other. The number of the supporting face 45 can change as required. However, there shall be at least one supporting face 45.

Figure 9:
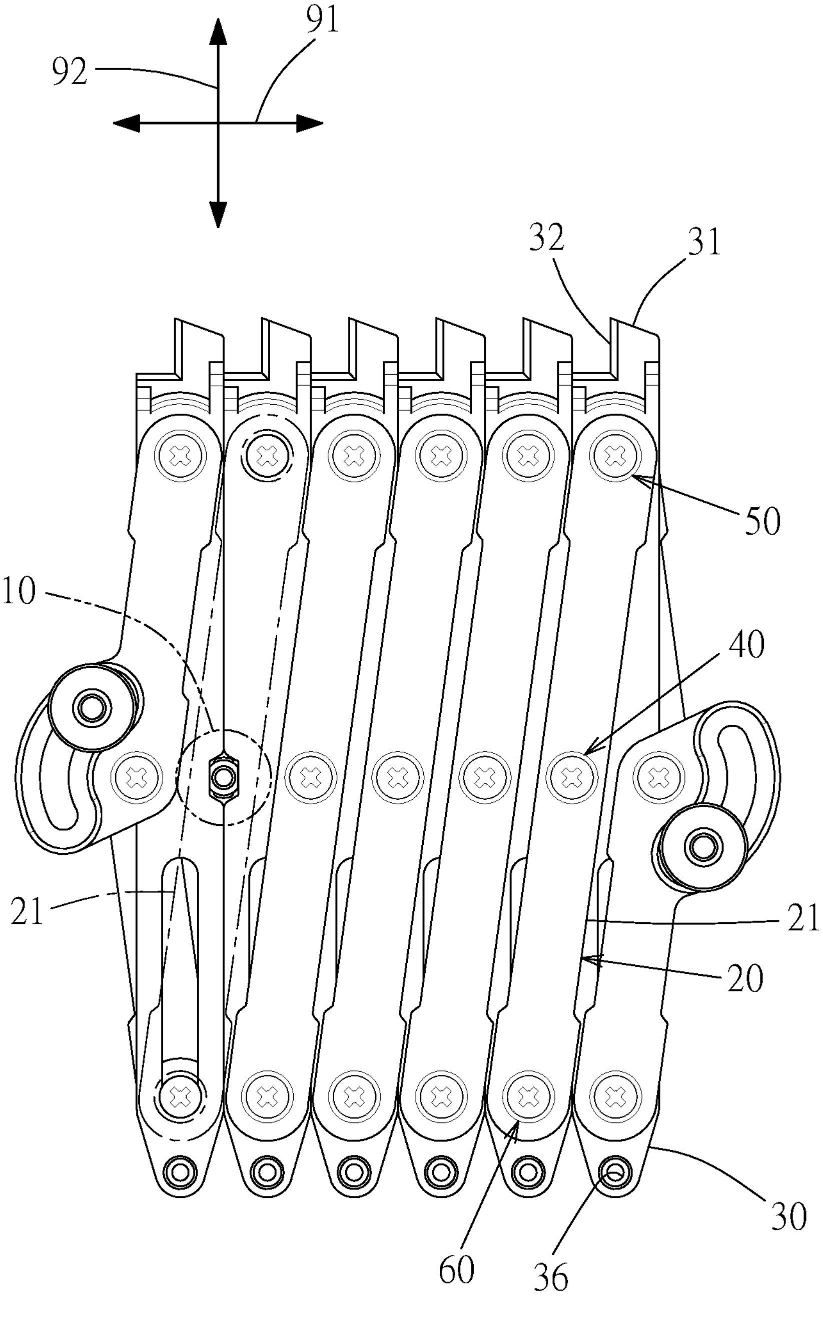
FIG. 9 is a front schematic view of the expanding and folding states of a preferred embodiment of the invention.
Figure 10:
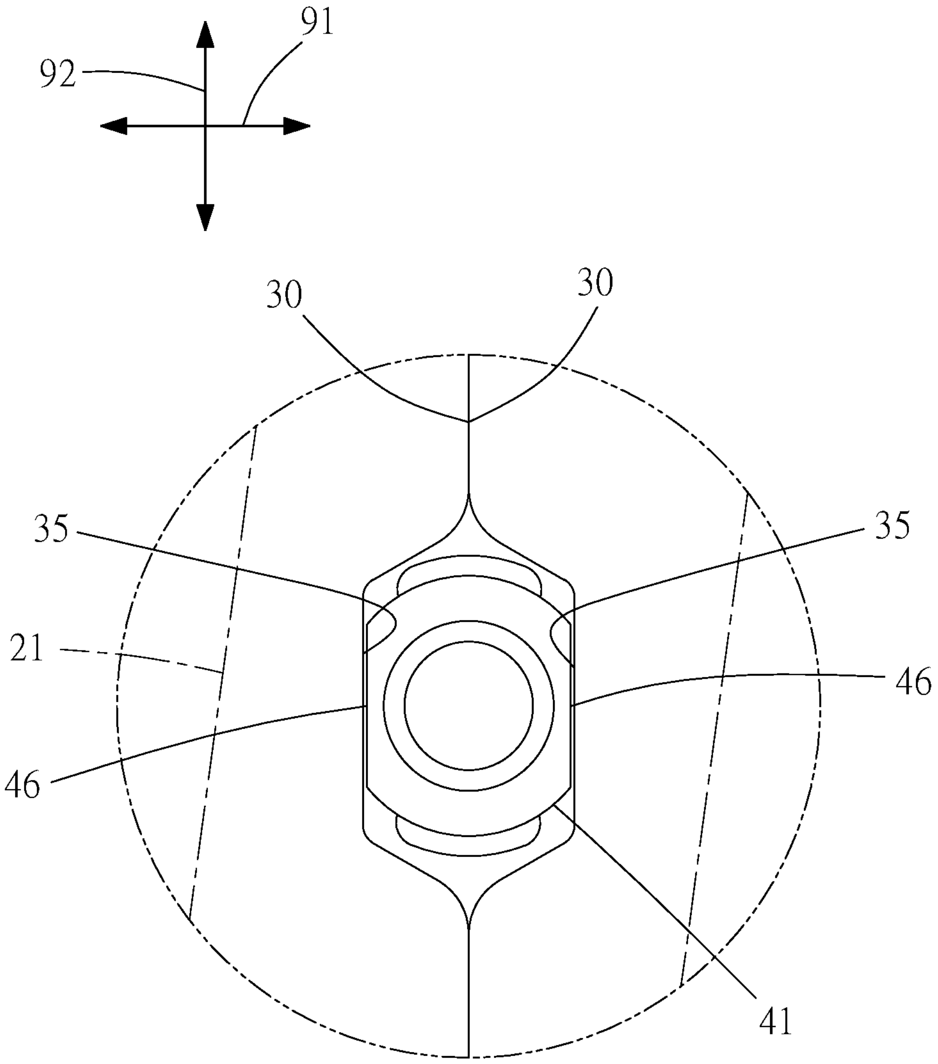
FIG. 10 is a partial enlarged view of FIG. 9.
Figure 11:
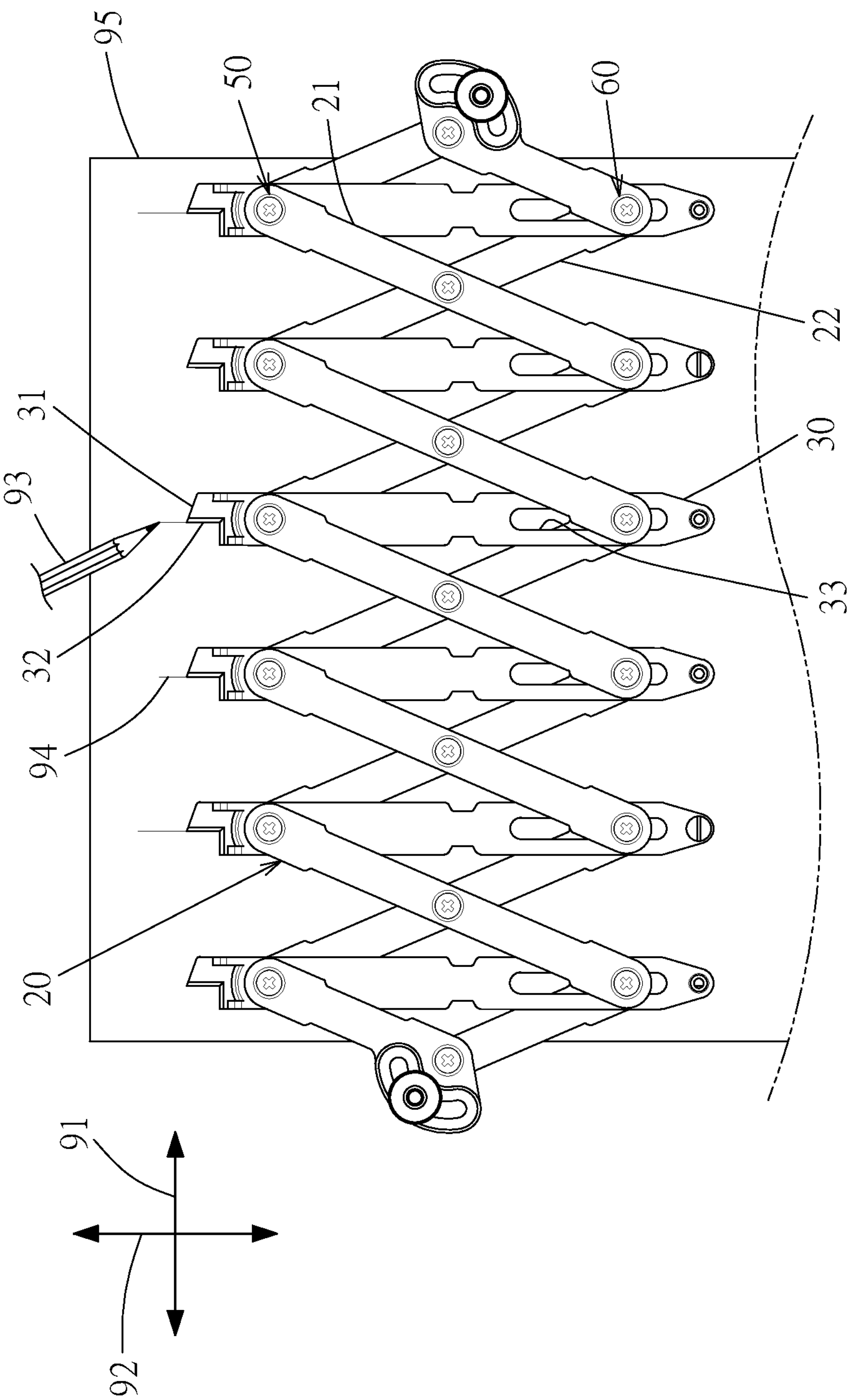
FIG. 11 is a front view of the working state of a preferred embodiment of the invention.

The two sides of the indicator plate 30 are respectively configured with an avoiding groove 35 along the first axial direction 91. As shown in FIG. 9 and FIG. 10, when the preferred embodiment is folded, the left side and right side of mainframe 20 move close to each other, and the indicator plates 30 configured along the first axial direction 91 move tightly adjacent to each other in the lateral direction. The laterally opposite avoiding groove 35 is formed with a space for the third shaft tube 41 to go through, thus reducing the width of the preferred embodiment along the first axial direction 91, and facilitating storage of the preferred embodiment. FIG. 9 shows a first connecting rods 21 depicted in the hidden state, to illustrate the avoiding groove 35 and the related components, the dotted lines being used to indicate the contour of the hidden first connecting rods 21.

The radial periphery of the third shaft tube 41 withdraws toward the inside of the third shaft tube 41 to form two avoiding faces 46, each of the avoiding face 46 being parallel to each other, so as to avoid the adjacent indicator plate 30 on the lateral direction, and to reduce the width of the preferred embodiment along the first axial direction 91 when folded. The avoiding face 46 matches the avoiding groove 35, thus reducing the extent of shrinkage of the width of the indicator plate 30 along the first axial direction 91 caused by the avoiding groove 35, and reducing the influence of the avoiding groove 35 upon the strength of the indicator plate 30. In the present embodiment, the avoiding face 46 extends to the two ends of the third shaft tube 41 in the axial direction.

The indicator plate 30 is formed with an indicating part 31 diverting toward the rear side of the mainframe 20. When the mainframe 20 is placed on a workpiece 95 for the operation of equidistant marking, the indicating part 31 can move close to the workpiece 95.

The indicator plate 30 is configured with a receptacle 36. The through groove 33 is located between the receptacle 36 and the indicating part 31. The receptacle 36 can be used for insertion of an anchoring component (not shown in the figure). The anchoring component can be a nail or an awl. When drawing the equidistant marking lines 94, the anchoring component can be used to fix the preferred embodiment on the workpiece 95, to avoid sliding and diversion of the preferred embodiment.

I claim:

1. An equal divider, comprising:

a mainframe, the mainframe is mainly made up of a plurality of first connecting rods and second connecting rods, arranged sequentially one behind the other and pivoted by a plurality of pivoting structures to form a scissor structure, both the first connecting rods and the second connecting rods are long plate, the top side of the mainframe is formed with a plurality of first pivoting parts, the bottom side of the mainframe is formed with a plurality of second pivoting parts, a virtual first axial direction is defined, the two ends of the first axial direction respectively point to the left side and right side of the mainframe, the first pivoting parts are distributed at equal intervals along the first axial direction, the second pivoting parts are distributed at equal intervals along the first axial direction, a virtual second axial direction is defined to be perpendicular to the first axial direction, the two ends of the second axial direction respectively point to the top side and bottom side of the mainframe, each of the first pivoting parts and each of the second pivoting parts match each other along the second axial direction one by one, the top sides of the first connecting rod and the second connecting rod are arranged one behind the other, the first pivoting parts along the thickness direction of the first connecting rods and the second connecting rods pivot the first connecting rods and the second connecting rods, the bottom sides of the first connecting rods and the second connecting rods are arranged one behind the other, the second pivoting parts along the thickness direction of the first connecting rods and the second connecting rods pivot the first connecting rods and the second connecting rods; and a plurality of indicator plates made of long plates, each indicator plate being configured between the first connecting rod and the second connecting rod, the first pivoting parts and the second pivoting parts configured along the second axial direction respective rivet the same indicator plate, the top side of the indicator plate close to the first pivoting part is configured with an upward protruding indicating part, one side of the indicating part is formed with an indicating face along the second axial direction, the indicating face provides lateral support for the marking tool to draw equidistant marking lines, the mainframe expands or shrinks along the first axial direction, each of the indicating part can be displaced along the first axial direction while maintaining equal distances;

wherein the indicator plate is configured with a long through groove along the second axial direction, the second pivoting part goes through the through groove, each indicating part and each first pivoting part maintain a fixed distance along the second axial direction;

the first pivoting part comprises a first shaft tube and a first screw bolt, the first connecting rod is configured with a first through hole, the indicator plate is configured with a perforation, one end of the first shaft tube is connected to the second connecting rods, the first shaft tube goes through the perforation and the first through hole in the axial direction, the first screw bolt screws into the first shaft tube, the first screw bolt has a first bolt head abutting the first shaft tube, the first bolt head and the first connecting rod are formed with relative stoppers along the axial direction of the first shaft tube, a first gap is formed between the first bolt head and the first connecting rod;

the second pivoting part comprises a second shaft tube and a second screw bolt, the first connecting rods is configured with a second through hole, one end of the second shaft tube is connected to the second connecting rods, the second shaft tube goes through the through groove and the second through hole along the axial direction, the second screw bolt screws into the second shaft tube, the second screw bolt has a second bolt head abutting the second shaft tube, the second bolt head and the first connecting rod are formed with relative stoppers along the axial direction of the second shaft tube, a second gap is formed between the second bolt head and the first connecting rod;

each pivoting structure comprises a third shaft tube and a third screw bolt, each first connecting rod is configured with a third through hole, one end of the third shaft tube is connected to the second connecting rod, the third shaft tube goes through the third through hole in the axial direction, the third screw bolt screws into the third shaft tube, the third screw bolt has a third bolt head abutting the third shaft tube, the third bolt head and the first connecting rod are formed with relative stoppers along the axial direction of the third shaft tube, a third gap is formed between the third bolt head and the first connecting rods;

the radial periphery of the third shaft tube is formed with a supporting face, the first connecting rod abuts the supporting face in the direction facing the second connecting rods.

2. The equal divider defined in claim 1, wherein the two sides of said indicator plate are respectively formed with an avoiding groove along the first axial direction, so that the indicator plate can laterally avoid the adjacent third shaft tube.

3. The equal divider defined in claim 1, wherein the radial periphery of the third shaft tube withdraws toward the inside of the third shaft tube to form two avoiding faces, each of the avoiding face being parallel to each other, so as to avoid the adjacent indicator plate on the lateral direction.

4. The equal divider defined in claim 2, wherein the radial periphery of the third shaft tube withdraws toward the inside of the third shaft tube to form two avoiding faces, the avoiding faces being parallel to each other, so as to avoid the adjacent indicator plate on the lateral direction.

5. The equal divider defined in claim 1, wherein said indicator plate is formed with the indicating part diverting toward the rear side of the mainframe.

6. The equal divider defined in claim 1, wherein said indicator plate is configured with a receptacle, the through groove is located between the receptacle and the indicating part.

* * * * *